Nov. 23, 1926.                                                          1,607,684
                            J. M. MOREHEAD
        METHOD AND APPARATUS FOR DETERMINING, INDICATING, AND RECORDING
             THE CALORIFIC VALUE OF LIQUID AND GASEOUS FUELS
                           Filed Feb. 2, 1923
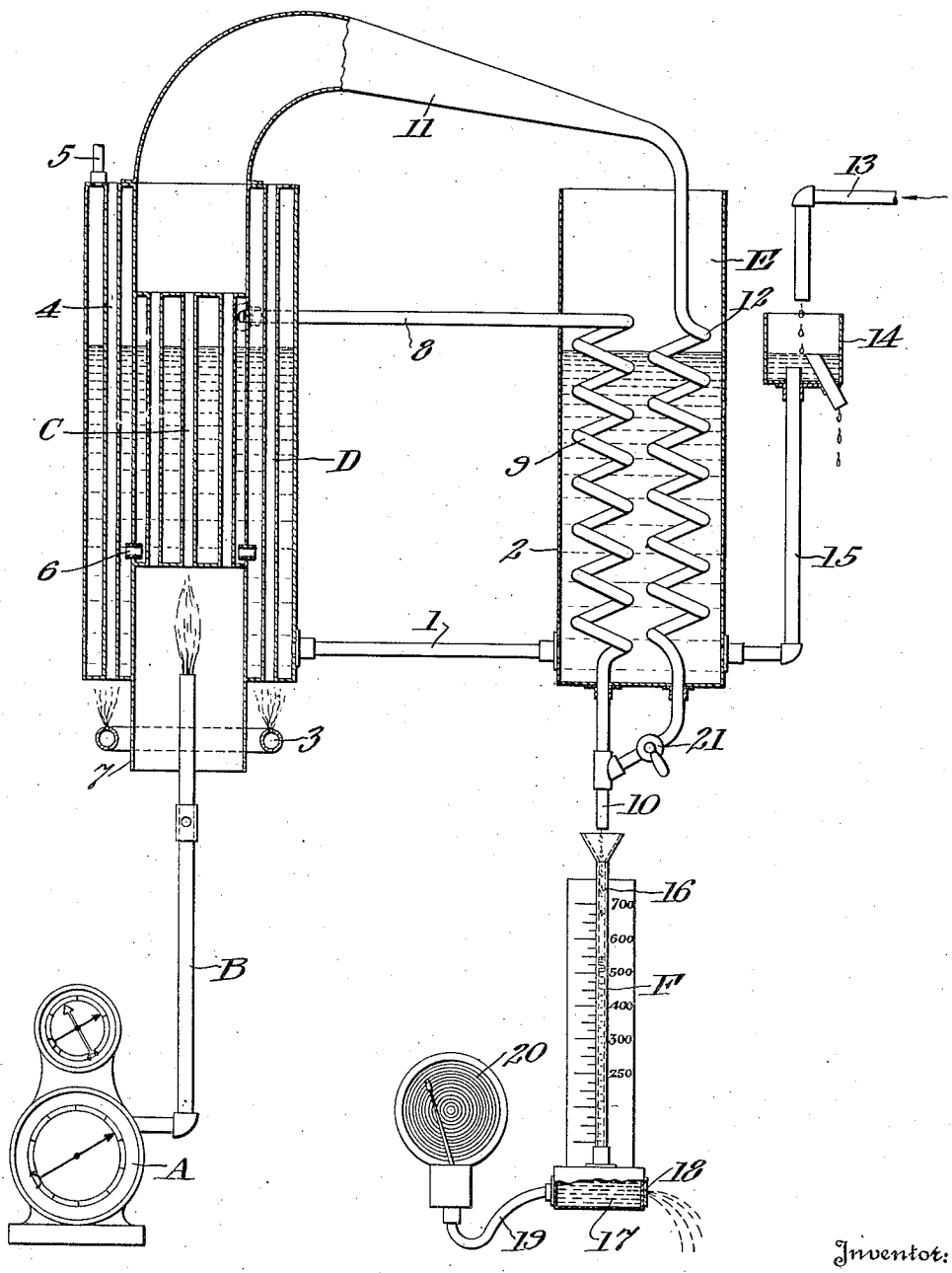
Inventor:
John Motley Morehead
By Byrnes Townsend & Brickenstein
Attorneys.

Patented Nov. 23, 1926.

1,607,684

UNITED STATES PATENT OFFICE.

JOHN MOTLEY MOREHEAD, OF RYE, NEW YORK.

METHOD AND APPARATUS FOR DETERMINING, INDICATING, AND RECORDING THE CALORIFIC VALUE OF LIQUID AND GASEOUS FUELS.

Application filed February 2, 1923. Serial No. 616,632.

This invention relates to apparatus and a method for measuring, indicating and recording the heat values of liquid and gaseous fuels.

In industrial plant operation it is desirable to have quick independent heat value determinations or a continuous indication of the heat value of a continuous supply of fuel. In order to be of value the determinations or indications must of course be accurate.

The so-called bomb calorimeter method of determining the heat value of fuels is accurate, but the method is not well adapted for plant control, because the determinations require considerable time and a continuous indication of the heat value of a continuous fuel supply by the method is impossible.

The so-called flow calorimeter is used for the purpose of obtaining quick heat value determinations and continuous heat value indications but is not entirely satisfactory for several reasons, among which may be mentioned its susceptibility to external heat influences, such as air drafts and changes in the temperature of the surrounding atmosphere and of the water supply, and the necessity for careful attention by a skilled operator. During each heat value determination which takes about 10 minutes the temperatures of the incoming and outflowing water must be frequently and accurately read, which calls for the constant attention of a skilled operator and the use of two high priced thermometers. The calculations from the readings obtained to arrive at the final result are more or less complicated. Self-indicating and recording flow-calorimeters have been made, but due to the nature of the measurements the apparatus necessary to directly indicate and record heat values is complicated, cumbersome, and expensive, and the heat value indications are unreliable.

An object of my invention is to provide a method and apparatus for determining the heat value of liquid and gaseous fuels by means of which quick and accurate independent heat value determinations or a continuous indication of the heat value of a continuous supply of fuel may be obtained by an unskilled operator.

My invention is based upon the determination of the heat value of a fuel by measuring the quantity of water or other liquid which a unit quantity of the fuel will evaporate from and at the boiling point of the liquid. I have devised a method based upon this principle which is quick and accurate and easily operated. I have also devised apparatus for carrying out the method which is practically automatic. The heat value of the fuel being tested may be determined by a simple calculation from a measurement of the quantity of liquid evaporated or, if desired, the heat value may be directly indicated or the heat value of a continuous supply of fuel may be continuously indicated and recorded, the method being readily adapted to be made to operate in this manner through the use of simple and inexpensive apparatus.

One form of apparatus embodying my invention and suitable for carrying out my method is illustrated in the accompanying drawings, in which the figure is a view, partly in section and partly in vertical elevation, of the apparatus.

Referring to the drawing, the letters A, B, C, D, E, and F mark the principal elements of the apparatus, to wit, A is a photometer meter, B is the fuel test burner, C is the heat exchange device or boiler, D is a protecting jacket for the boiler C, E is the condenser for the distillate from the boiler C, and F is the indicating and recording mechanism.

It will be understood that the invention is not limited to the particular arrangement, construction, or shapes of the parts of the apparatus illustrated on the drawing. It may, for instance, be desirable to mount the various parts of the apparatus in a suitable box or case, the shape of the parts and their arrangement being selected and designed so that the assembly will be compact and occupy a relatively small space.

The so-called photometer meter is a device by means of which a known regulated flow of gas to the burner B can be obtained, for instance, ten cubic foot per hour. This device is well known and does not require further description. It is to be understood that the invention is not limited to the use of a photometer meter for regulating the supply of fuel to the burner. When continuous measurements are to be made as will appear hereinafter it is necessary to maintain a constant measured supply of fuel to the burner, but any suitable means may be employed for this purpose. When a single determination of the heat value of a fuel is all that is desired any suitable means for supplying the burner with a measured quantity of fuel may be used.

The burner B may be of any approved type for securing good combustion of the fuel, that is, substantially complete combustion. The burner illustrated is the ordinary Bunsen burner for gaseous fuels. It is obvious that when a liquid fuel is to be tested a suitable liquid fuel burner will be used.

The boiler C illustrated is of the fire tube type, but the invention is not limited to this type of boiler or to the particular construction illustrated. Any approved type of boiler or heat exchange device capable of efficiently bringing the products of combustion from the burner B into heat exchange relation with the water or other liquid in the boiler may be used.

The boiler C is insulated or protected from external heat influences by the water jacket D, which surrounds and extends a suitable distance above and below it. Water is supplied to the jacket D through the pipe 1 leading from the cooling water tank 2 of the condenser E, the water in the jacket being maintained at its boiling point by means of the burner 3, the flame of which passes through the vertical flues 4. The fuel supply to the burner 3, if measured at all, is measured separately from the fuel supply to the test burner B. The interior of the jacket communicates freely with the atmosphere, thus maintaining it at atmospheric pressure, through the pipe or opening 5. The boiler C is supplied with water at the boiling temperature from the jacket D through the openings 6, 6. The curtain 7 serves to confine the heat of the test burner to the boiler, and also to protect the flame from drafts, and further to prevent the transfer of heat from the burner 3 to the boiler C. It will be understood that the invention is not limited to the particular type of heat insulating jacket D illustrated, although I prefer this or some equivalent arrangement. It is obvious that the water supply to the jacket may come from any suitable source other than that described, and that the jacket may be maintained at the boiling temperature of water in a variety of ways. The water jacket illustrated might even be replaced by other types of non-conducting heat insulating jackets, such as an air or vacuum space or a covering of heat insulating material. It is also evident that the boiler C need not be supplied with water from the jacket D but may be supplied with boiling water from any other suitable source of supply.

The steam generated in the boiler C is conveyed by the pipe 8 to the condensing coil 9 of the condenser E, and the resulting water passes through the pipe 10 to the indicating and recording apparatus F. The combustion gases from the burner B after they have given up their heat to the water in boiler C are delivered by the pipe 11 to the cooling coil 12 where the water content of the gases is condensed and delivered through the pipe 10 to the recording apparatus. In this connection it is noted that the collection and measurement of the water content of the combustion gases along with the water distilled from the boiler C gives a measurement of the gross heat value of the fuel, that is, the quantity of heat in the combustion gases available down to the point to which the gases are cooled by the boiler C, plus the quantity of heat remaining in the gases in the form of latent heat of vaporization of the water content thereof. If only the net heat value of the fuel, that is, the heat available from the products of combustion down to the temperature to which they are cooled by the boiler, is desired, then the water condensed from the products of combustion is not collected along with the distillate from the boiler but may be discharged through the three-way cock 21.

The condenser E is supplied with water at constant level by the pipe 13, the overflow box 14, and the pipe 15 as illustrated. In this connection it is noted that only so much cooling water passes through the condenser E as is converted to steam in the boiler C and the jacket D. If this quantity of water is insufficient for the cooling of the coils 9 and 12, a greater quantity of water may be contacted with the coils 9 and 12 by providing an auxiliary overflow (not shown) for water from the tank 2.

The indicating and recording apparatus F comprises a graduated tube 16 communicating with the well 17 having an orifice 18, the well 17 communicating through the pipe 19 with the pressure indicating and recording device 20. In the simplest embodiment of my invention, that is, when it is desired merely to make a single heat value determination, a measured quantity of fuel is burned in the test burner B and the water distilled and the water content of the combustion gases is collected and weighed or measured and the heat value of the fuel determined by a simple calculation from the known fact that it required 969.7 B. t. u. to evaporate one pound of water from and at 212° F. at normal barometric pressure, that is, 760 mm. of mercury. This calculation may, however, be avoided by collecting the water distilled in a tube calibrated to indicate heat units directly. For instance, the tube can be calibrated to indicate the number of B. t. u. in a cubic foot of gas or in a pound of liquid fuel or any other suitable units of fuel. In the preferred form of my invention I prefer to provide for continuously indicating and recording the heat value of the fuel supplied to the test burner. For this purpose I have made use of the known principle that the head or pressure of a supply of liquid to an orifice varies as the square of the amount of liquid vented through the orifice. In the application of this principle I have provided the tube 16 calibrated in heat units, said tube communicating with the well 17 having the discharge orifice 18. The calibration of the tube 16 and the size of the orifice are adjusted to conform with any given rate of supply of fuel to the test burner, for instance, ten cubic feet per hour, so that when a gas having a heat value of say 550 B. t. u. per cubic foot is supplied to the burner at a uniform rate of say ten cubic feet per hour the collection of water in the tube 16 and the discharge of water through the orifice 18 will be equal and the column of water in the tube 16 will stand at the line marked 550. It will be apparent that as the calorific value of the fuel varies, the rate of supply being constant, the rate of distillation will vary and the height of the column of water in the tube 16 will vary, thus indicating at all times the heat value of the fuel being burned.

The pressure at the base of the column of water in the tube 16 of course varies with the height of the column. This condition gives an easy means for the making of a continuous record of the heat value of the fuel burned. For this purpose the pressure gauge 20 is connected to the well 17 and the indicator of the pressure gauge is made to mark upon a suitably ruled moving chart the pressure of the column of water in the tube 16 or preferably, by the use of a suitably ruled chart, the heat value of the fuel is recorded directly. Instead of measuring the quantity of water evaporated by condensing and collecting the distillate, the heat value of the fuel can be determined by measuring the quantity of water supplied to the boiler in maintaining a constant level therein. By means of suitably calibrated metering apparatus the measurement of the water supplied to the boiler could be made to indicate directly and even record the heat value of the fuel.

It will thus be seen that I have provided a method and apparatus for determining the heat value of a fuel through the measurement of the quantity of water evaporated from and at its boiling point by a unit quantity of the fuel. The heat value may be determined by burning a single unit of the fuel, measuring the quantity of water distilled and calculating therefrom the heat value of the fuel, or a direct indication of the heat value of the fuel can be obtained by measuring the quantity of water distilled in a properly calibrated measuring vessel. It will be apparent that the water distilled might be weighed instead of measured volumetrically and the heat value calculated from the weight, or the weighing device might be made to indicate heat value directly. I have further provided a method and apparatus for continuously indicating and recording the heat value of a continuous supply of fuel. In this connection it is noted that the indicating and recording apparatus described might be replaced by any suitable vessel for collecting the distilled water and having a vent for its discharge and means for weighing the water in the vessel, said weighing means being calibrated to indicate and record either weight or heat value.

While I have referred herein particularly to the determination of heat values by measuring the quantity of water distilled from and at its boiling point by the combustion of a unit quantity of fuel, it will be apparent that other liquids, for example, alcohol, liquid hydrocarbons and the like, may be employed.

I claim:

1. Method of determining the heat value of a fuel, which comprises maintaining a body of liquid at its boiling temperature, burning a measured quantity of a fuel and bringing the resulting products of combustion directly into heat transfer relation to said body of liquid, and measuring the quantity of said liquid evaporated by the transfer of heat thereto from said products of combustion.

2. Method of determining the heat value of a fuel which comprises, heating a body of liquid to its boiling temperature, transferring the heat of combustion of a measured quantity of said fuel to said body of liquid, replacing the liquid so evaporated by an equal quantity of the same liquid at its boiling temperature, and condensing, collecting and measuring the quantity of liquid evaporated.

3. Method for continuously indicating the heat value of a fuel which comprises, maintaining a body of liquid at its boiling temperature, burning a uniform supply of said fuel and bringing the products of combustion into heat transfer relation to said body of liquid, and measuring the rate of distillation of said liquid.

4. Apparatus for determining the heat value of a fuel comprising, a fuel burner, means for measuring the supply of fuel to said burner, a boiler containing a liquid in heat transfer relation to the products of combustion from said burner, means for maintaining a liquid in said boiler at its boiling temperature, and means for measuring the quantity of liquid evaporated.

5. Apparatus for determining the heat value of a fuel comprising, a liquid boiler, a liquid jacket for said boiler and communicating therewith, and means for maintaining the liquid in said jacket at its boiling temperature.

6. Apparatus for indicating the heat value of a fuel, comprising a boiler, means for supplying liquid at a substantially constant temperature to the boiler, means for supplying the fuel to the burner at substantially constant rate and means for indicating the rate of evaporation of the liquid.

7. Apparatus according to claim 6, wherein the means for measuring the rate of evaporation includes a condenser and means for indicating the rate of flow of the liquid resulting from the condensation, out of the condenser.

8. Apparatus according to claim 6, wherein the liquid is supplied at boiling point temperature.

9. Apparatus for indicating the heat value of a fuel, comprising a boiler including two separate sections in communication with each other, means for maintaining a liquid in one of the sections at a substantially constant temperature, means for heating the other section, comprising a combustion device and means for furnishing fuel thereto at a substantially constant rate, and means for indicating the rate of evaporation of the liquid.

10. Apparatus for determining the heat value of a fuel comprising, a boiler, a liquid jacket surrounding said boiler, means for supplying said jacket with liquid, means permitting a flow of liquid from said jacket to said boiler, means for heating the liquid in said jacket to boiling temperature, a test burner, means for supplying said burner with a measured quantity of fuel, and means for measuring the quantity of liquid evaporated in said boiler.

11. Apparatus for continuously indicating the heat value of a continuous supply of a fuel comprising, a boiler, means for supplying said boiler with liquid, a burner and means for supplying the same with fuel, means for collecting and condensing the distillate from said boiler, a tube for receiving said condensate, said tube having an orifice at the lower end thereof for the discharge of condensate, and markings on said tube whereby the height of liquid in said tube indicates the heat value of said fuel.

12. Apparatus as defined in claim 11 in which the column of liquid in said condensate receiving tube is connected with a pressure sensitive device, calibrated to indicate and record heat units directly.

13. Apparatus for measuring, indicating and recording the heat value of a fuel comprising, a test burner and means for supplying the same with a uniform measured flow of fuel, a liquid boiler and means for supplying the same with liquid at boiling temperature, means for condensing and collecting the liquid evaporated in said boiler by heat supplied thereto by the combustion of the fuel in said test burner, and a flow meter for said distillate calibrated to indicate the heat value of said fuel.

In testimony whereof, I affix my signature.

JOHN MOTLEY MOREHEAD.